United States Patent
Sawada et al.

(10) Patent No.: US 9,101,011 B2
(45) Date of Patent: Aug. 4, 2015

(54) LIGHTING SYSTEM INCLUDING POWER CONVERSION USING A CONTROL SIGNAL BASED ON ILLUMINANCE INFORMATION FROM A SOLAR POWER GENERATOR

(75) Inventors: Akinobu Sawada, Kyoto (JP); Koji Taniuchi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 142 days.

(21) Appl. No.: 13/583,717

(22) PCT Filed: Feb. 2, 2011

(86) PCT No.: PCT/JP2011/052087
§ 371 (c)(1),
(2), (4) Date: Sep. 10, 2012

(87) PCT Pub. No.: WO2011/111442
PCT Pub. Date: Sep. 15, 2011

(65) Prior Publication Data
US 2013/0002142 A1  Jan. 3, 2013

(30) Foreign Application Priority Data
Mar. 11, 2010 (JP) .................... 2010-054042

(51) Int. Cl.
*H05B 37/02* (2006.01)
*H05B 33/08* (2006.01)
(Continued)

(52) U.S. Cl.
CPC .............. *H05B 33/0809* (2013.01); *G05F 1/67* (2013.01); *H02J 3/385* (2013.01); *H05B 37/00* (2013.01); *F21S 9/032* (2013.01); *Y02E 10/28* (2013.01); *Y02E 10/563* (2013.01); *Y02E 70/30* (2013.01)

(58) Field of Classification Search
CPC ..... F21S 9/032; H05B 33/0809; H05B 37/00; Y02E 10/58; Y02E 10/563; Y02E 70/30; Y02E 10/763; Y02E 10/50; Y02E 60/60; G05F 1/67; H02J 3/383; H02J 3/385
USPC ............ 315/149, 159, 297, 209 R, 291, 307, 315/224, 287, 158; 362/183, 157, 418; 320/141; 363/15
See application file for complete search history.

(56) References Cited

U.S. PATENT DOCUMENTS 7,598,703 B2 * 10/2009 Zhang et al. .................. 320/107
8,138,631 B2 *  3/2012 Allen et al. ..................... 307/82
(Continued)

FOREIGN PATENT DOCUMENTS

JP      04-366893      12/1992
JP      05-326163      12/1993
(Continued)

OTHER PUBLICATIONS

International Search Report for PCT/JP2011/052087 dated May 10, 2011.

*Primary Examiner* — Douglas W Owens
*Assistant Examiner* — Borna Alaeddini
(74) *Attorney, Agent, or Firm* — Fish & Richardson P.C.

(57) ABSTRACT

A lighting system has a solar power generation section, a control section which generates a control signal based on the output of the solar power generation section, a power conversion section which converts a direct-current electric power input thereto to output a direct-current electric power, and a lighting section which is driven by the direct-current electric power output from the power conversion section.

3 Claims, 12 Drawing Sheets

(51) Int. Cl.
*G05F 1/67* (2006.01)
*H02J 3/38* (2006.01)
*H05B 37/00* (2006.01)
*F21S 9/03* (2006.01)

(56) References Cited

U.S. PATENT DOCUMENTS

2004/0261786 A1\* 12/2004 Kirk .............................. 126/600
2010/0109571 A1    5/2010 Nishino et al.

2013/0002142 A1\*  1/2013 Sawada et al. ................ 315/152

FOREIGN PATENT DOCUMENTS

| JP | 05326163 A | \* 12/1993 |
| JP | 2006-073419 | 3/2006 |
| JP | 2006-244711 | 9/2006 |
| JP | 2006-351486 | 12/2006 |
| JP | 2008-187821 | 8/2008 |
| JP | 2009-123608 | 6/2009 |

\* cited by examiner

FIG.10A
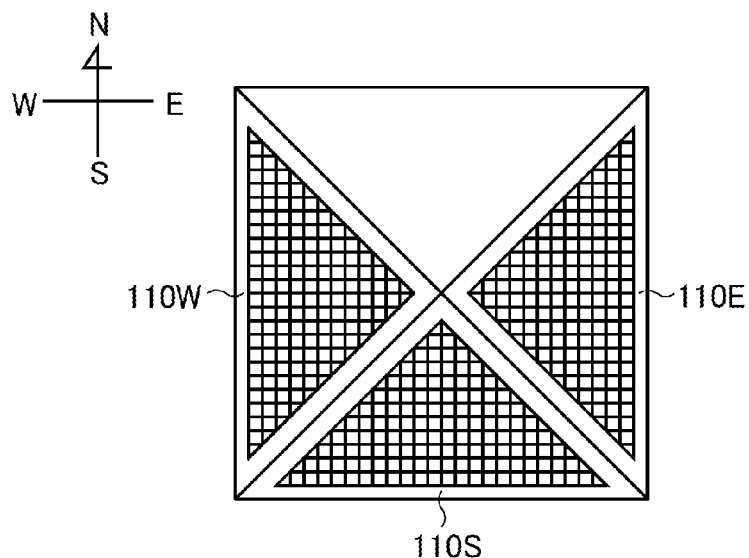
FIG.10B
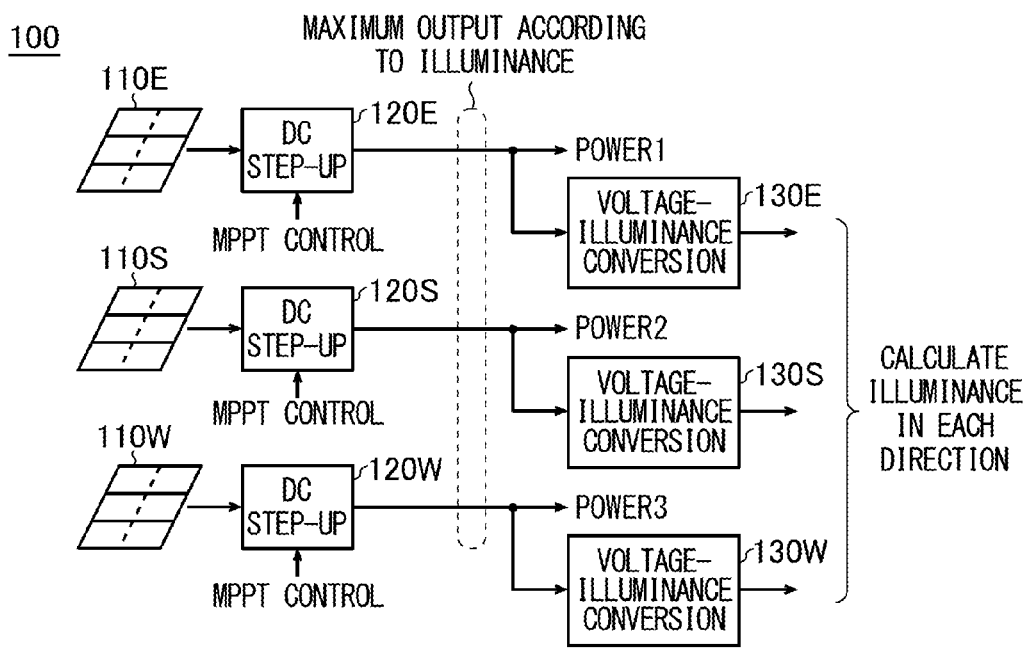
FIG.10C
| ILLUMINANCE | TIME OF DAY | LIGHT COLOR | COLOR TEMPERATURE |
|---|---|---|---|
| EAST > SOUTH > WEST | MORNING | BLUISH WHITE | HIGH |
| SOUTH > EAST, WEST | MIDDAY | WHITE | MEDIUM |
| WEST > SOUTH > EAST | EVENING | INCANDESCENT-LIKE | LOW |

FIG.12

| ILLUMINANCE | DAYTIME | NIGHTTIME |
|---|---|---|
| LOW | LIT (AUTOMATIC) | LIT (AUTOMATIC) |
| MEDIUM | CONTROLLED (AUTOMATIC) | CONTROLLED (MANUAL) |
| HIGH | EXTINGUISHED (AUTOMATIC) | EXTINGUISHED (MANUAL) |

LIGHTING SYSTEM INCLUDING POWER CONVERSION USING A CONTROL SIGNAL BASED ON ILLUMINANCE INFORMATION FROM A SOLAR POWER GENERATOR

TECHNICAL FIELD

The present invention relates to a lighting system for controlling the lighting of a light fitting.

BACKGROUND ART

FIGS. 14 and 15 are a schematic diagram and a block diagram, respectively, of a conventional example of a lighting system. In this conventional lighting system, for the purpose of controlling the lighting of a light fitting 20 (for example, an LED (light emitting diode) light employing a light emitting diode as a light source) installed indoors, an illuminance sensor 50 is used as a means of acquiring information on the indoor illuminance. That is, in this conventional lighting system, by use of the illuminance sensor 50, which is arranged at a spot (or in an area) where constant illuminance is desired, indoor illuminance information is acquired with respect to the illumination light from the light fitting 20 plus the light (sunlight) shining in through a window, and the so acquired illuminance information is fed to the LED driver 30 for the control of the lighting of the light fitting 20.

In addition, in recent years, out of growing ecological concerns, solar power generation has been receiving much attention for the comparatively light burden it inflicts on the earth's environment. Accordingly, the above-mentioned conventional lighting system is so configured that it can use, as the electric power source for the LED driver 30, both commercial electric power and a solar cell 10.

An example of the conventional technology discussed above is seen in Patent Document 1 listed below.

LIST OF CITATIONS

Patent Literature

Patent Document 1: JP-A-2009-123608

SUMMARY OF INVENTION

Technical Problem

Inconveniently, however, in the conventional lighting system discussed above, as mentioned above, the lighting control of the light fitting 20 requires the arrangement of the illuminance sensor 50 (in the example shown in FIG. 15, it includes a photodiode 51, a sense resistor 52, an analog/digital converter 53, and an illuminance-luminance converter 54).

Devised to address the above-mentioned inconvenience that the present inventors have found, the present invention has as an object to provide a lighting system that can control the lighting of a light fitting without the use of an illuminance sensor.

Solution to Problem

To achieve the above object, according to one aspect of the invention, a lighting system includes: a solar power generation section; a control section which generates a control signal based on the output of the solar power generation section; a power conversion section which converts a direct-current electric power input thereto to output a direct-current electric power; and a lighting section which is driven by the direct-current electric power output from the power conversion section (a first configuration).

In the lighting system of the first configuration described above, preferably, the direct-current electric power input to the power conversion section is a direct-current electric power that the solar power generation section outputs based on sunlight (a second configuration).

In the lighting system of the second configuration described above, preferably, the power conversion section includes: a first power conversion section which converts the direct-current electric power input thereto from the solar power generation section to output a predetermined direct-current electric power; and a second power conversion section which converts the direct-current electric power input thereto from the first power conversion section to output a direct-current electric power (a third configuration).

In the lighting system of the third configuration described above, preferably, the predetermined direct-current electric power is a constant direct-current electric power.

In the lighting system of any one of the first to fourth configurations described above, preferably, the control section includes: a monitoring section which monitors the output of the solar power generation section; and a control signal generation section which outputs the control signal based on monitoring information from the monitoring section (a fifth configuration).

In the lighting system of the first configuration described above, preferably, the direct-current electric power input to the power conversion section is based on a direct-current electric power different from the direct-current electric power generated by the solar power generation section (a sixth configuration).

In the lighting system of the sixth configuration described above, preferably, there is further provided a power storage section which generates the direct-current electric power input to the power conversion section (a seventh configuration).

In the lighting system of the seventh configuration described above, preferably, the power storage section is charged by a direct-current electric power based on commercial electric power (an eighth configuration).

In the lighting system of any one of the first to eighth configurations described above, preferably, the lighting section comprises a light emitting diode (a ninth configuration).

According to another aspect of the invention, a lighting system includes: a solar power generation section which generates a direct-current electric power by receiving sunlight; a lighting section which illuminates inside a room; an information acquisition section which monitors the output of the solar power generation section to acquire information on the illuminance and direction of the sunlight; and a driver section which controls the luminance of the lighting section based on the output of the information acquisition section (a tenth configuration).

In the lighting system of the tenth configuration described above, preferably, the driver section has table information that describes a correlation between the illuminance of the sunlight and the luminance of the lighting section (an eleventh configuration).

In the lighting system of the eleventh configuration described above, preferably, the content of the table information can be changed as desired (a twelfth configuration).

In the lighting system of any one of the tenth to twelfth configurations described above, preferably, the solar power generation section has a plurality of solar cell panels (a thirteenth configuration).

In the lighting system of the thirteenth configuration described above, preferably, the information acquisition section compares the outputs of the plurality of solar cell panels to detect the direction of the sunlight from the result of the comparison (a fourteenth configuration).

In the lighting system of any one of the tenth to fourteenth configurations described above, preferably, there is further provided a power supply section which feeds the direct-current electric power generated by the solar power generation section to the driver section without converting the direct-current electric power into an alternating-current electric power (a fifteenth configuration).

In the lighting system of any one of the tenth to fifteenth configurations described above, preferably, how the lighting section is controlled is changed according to time of day (a sixteenth configuration).

Advantageous Effects of the Invention

With a lighting system according to the present invention, it is possible to control the lighting of a light fitting without the use of an illuminance sensor.

BRIEF DESCRIPTION OF DRAWINGS

FIG. 10A is a diagram illustrating lighting control according to the direction of sunlight (an example of panel arrangement);

FIG. 10B is a diagram illustrating lighting control according to the direction of sunlight (a block diagram);

FIG. 10C is a diagram illustrating lighting control according to the direction of sunlight (light color table);

FIG. 12 is a table in illustration of lighting control according to time of day;

DESCRIPTION OF EMBODIMENTS

Figure 1:
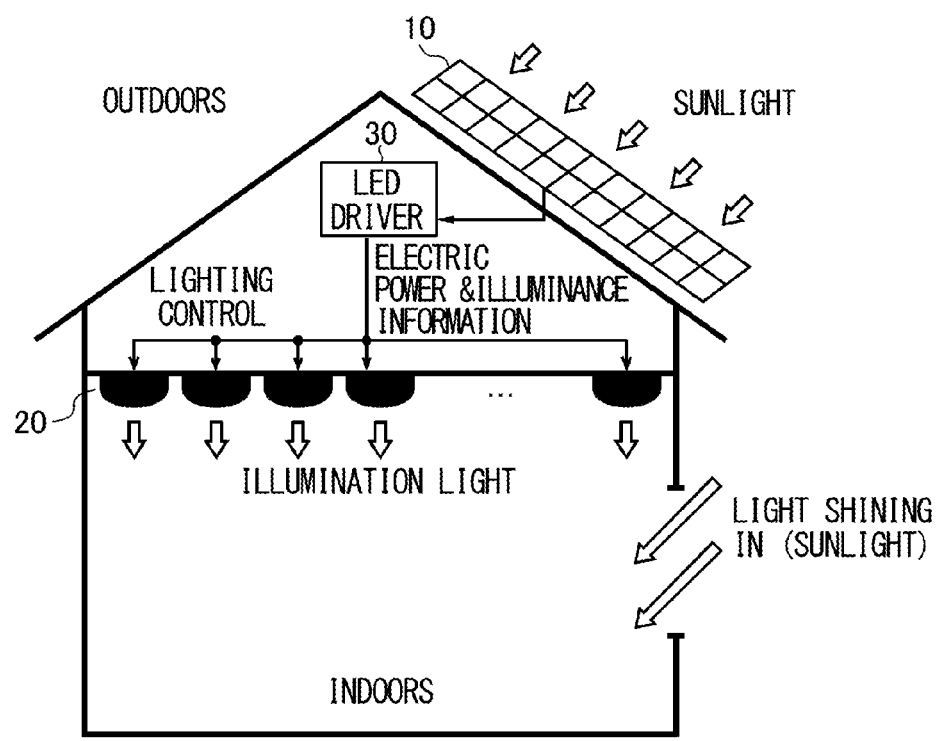
FIG. 1 is a schematic diagram showing a lighting system according to a first application example of the invention.

FIG. 1 is a schematic diagram showing a lighting system according to a first application example of the invention. As shown in FIG. 1, the lighting system according to the invention includes a solar cell 10 which is installed outdoors, an LED light 20 which is installed indoors (in a room with a window through which to take in outside light), and an LED driver 30 which controls the lighting of the LED light 20. In FIG. 1, the LED light 20 and the LED driver 30 are illustrated as separate block elements; instead, the LED driver 30 may be incorporated in the LED light 20.

The lighting system according to the invention is so configured that it can use, as the source of electric power for the LED driver 30, not only a commercial electric power source but also the solar cell 10. In the present description, a "solar cell" may be one composed of a single cell, or may be a solar cell array composed of a plurality of cells.

The lighting system according to the invention is so configured that, for the control of the lighting of the LED light 20, instead of an illuminance sensor being installed indoors, the output of the solar cell 10 is monitored to acquire information on the illuminance of outside light (sunlight), the acquired information then being fed to the LED driver 30 for the control of the lighting of the LED light 20.

Figure 2:
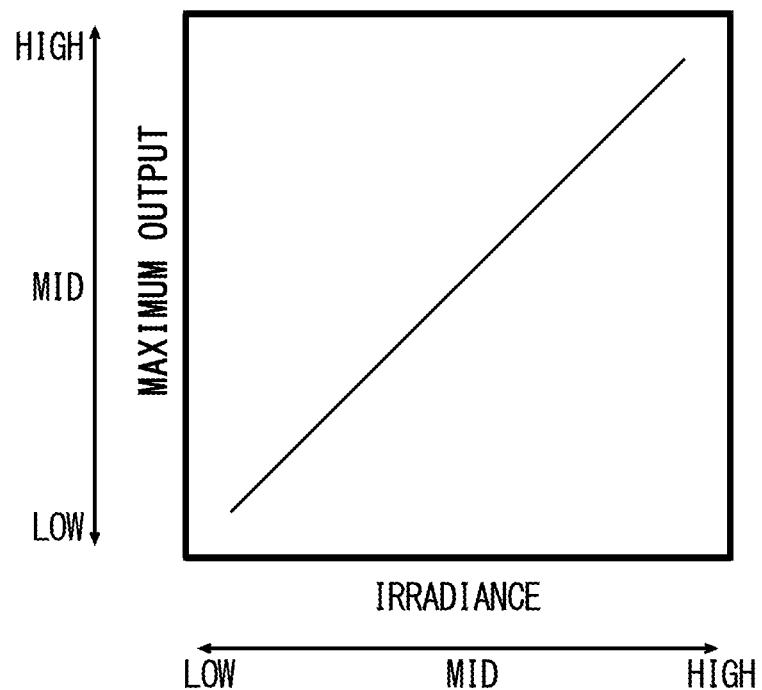
FIG. 2 is a diagram showing a correlation between irradiance and maximum output.

FIG. 2 is a diagram showing the correlation between irradiance and maximum output. As shown in FIG. 2, the maximum output of the solar cell 10 is approximately proportional to the irradiance of outside light (sunlight). Accordingly, in a configuration where the solar cell 10 is used at its maximum output all the time, it is possible to acquire, from the output of the solar cell 10, information on the illuminance of outside light, and hence to acquire information on the estimated illuminance of light shining indoors through the window.

Out of the above consideration, the lighting system according to the invention is so configured that, without the use of an illuminance sensor, the lighting of the LED light 20 is controlled according to the output of the solar cell 10. More specifically, the lighting system according to the invention is so configured as to convert different pieces of information acquired in the maximum power point tracking control (hereinafter, MPPT control) of the solar cell 10 (in particular, the maximum output value of the solar cell 10) into information on the illuminance of outside light and, based on this illuminance information, set the luminance value of the LED light 20. With a lighting system like this, it is possible to keep the indoor illuminance constant without the use of an illuminance sensor, and thus with a very inexpensive configuration.

Figure 3:
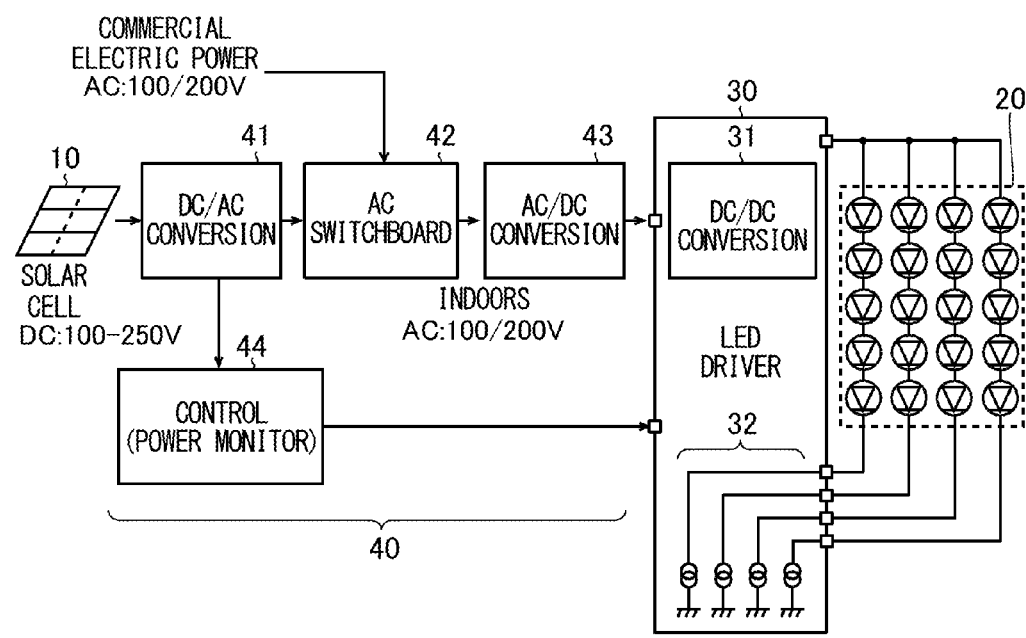
FIG. 3 is a block diagram showing an outline of the configuration of a power supply device 40.

Next, the configuration of a power supply device 40 (not shown in FIG. 1 previously referred to) for feeding electric power and illuminance information to the LED driver 30 will be described in an outline. FIG. 3 is a block diagram showing an outline of the configuration of the power supply device 40. As shown in FIG. 3, the power supply device 40 includes a DC/AC conversion section 41, an AC switchboard 42, an AC/DC conversion section 43, and a control section 44, and is provided between the solar cell 10 and the LED driver 30.

The DC/AC conversion section 41 converts the direct-current electric power (for example, 100 V to 250 V DC) generated by the solar cell 10 to output an alternating-current electric power (100 V/200 V AC) matching the commercial electric power.

The AC switchboard 42 distributes indoors the alternating-current electric power from the DC/AC conversion section 41 and the alternating-current electric power from the commercial electric power source. When the electric power generated by the solar cell 10 is higher than the electric power consumed indoors, the surplus of the generated electric power can be sold to the commercial electric power source via the AC switchboard 42.

The AC/DC conversion section 43 converts the alternating-current electric power from the AC switchboard 42 to feed a direct-current electric power to the LED driver 30. The LED driver 30 incorporates a DC/DC conversion section 31, which converts the direct-current electric power from the AC/DC conversion section 43 to feed a predetermined direct-current electric power to the LED light 20.

The control section 44, on one hand, performs MPPT control of the DC/AC conversion section 41 so that the solar cell 10 is used at its maximum output all the time and, on the other hand, monitors the output power of the solar cell 10 to acquire illuminance information on outside light in order to feed a control signal based on the illuminance information to the LED driver 30. The LED driver 30 incorporates a current control section 32, which performs, based on the control signal (illuminance information) from the control section 44, pulse width modulation control (PWM control) or peak value control with respect to the drive current that passes through the LED light 20. Owing to the current control section 32 operating in this way, the LED light 20 is lit with luminance that reflects the illuminance of outside light (sunlight). For example, the indoor illuminance can be kept constant by lowering the luminance of the LED light 20 when it is light outdoors and raising the luminance of the LED light 20 when it is dim outdoors.

Figure 4:
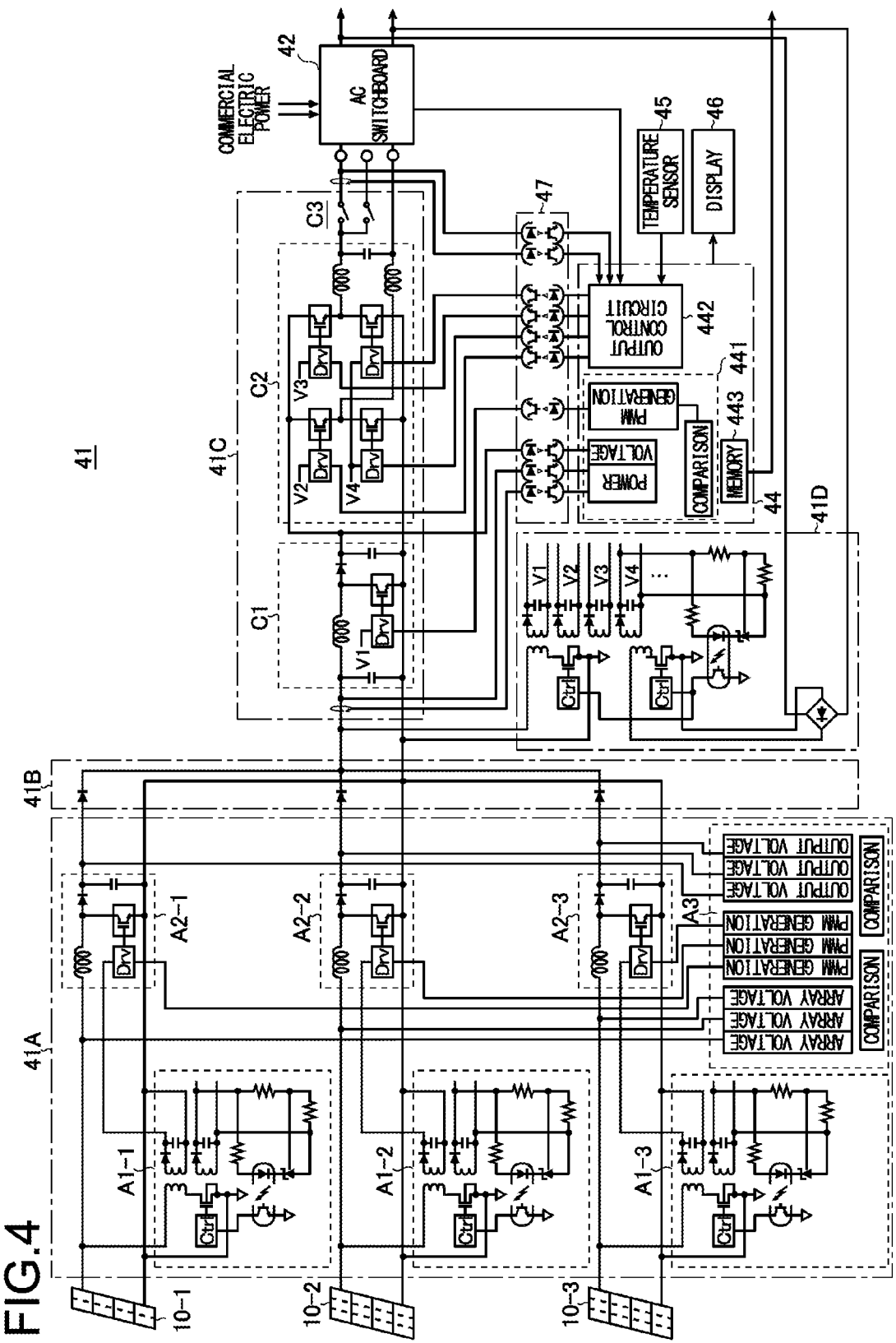
FIG. 4 is a circuit diagram showing the details of the configuration of the power supply device 40.

FIG. 4 is a circuit diagram showing the details of the configuration of the power supply device 40 (in particular the stages preceding the AC switchboard 42). As shown in FIG. 4, the DC/AC conversion section 41 includes a step-up box 41A, a connection box 41B, a power conversion circuit section 41C, and a power supply circuit section 41D.

The step-up box 41A steps up the output voltages of a plurality of (in FIG. 4, three) solar cells 10-1 to 10-3 to an equal voltage level and outputs the stepped-up voltages. The step-up box 41A includes power supply circuits A1-1 to A1-3, step-up circuits A2-1 to A2-3, and a control circuit A3.

The power supply circuits A1-1 to A1-3 are circuits that respectively generate, from the output voltages of the solar cells 10-1 to 10-3, supply voltages for operating driver sections (circuit elements indicated by "Dry" in FIG. 4) provided in the step-up circuits A2-1 to A2-3. Preferably, as shown in FIG. 4, the power supply circuits A1-1 to A1-3 are each so configured as to perform feedback control with respect to the supply voltages to be generated, with their input and output isolated from each other by use of a transformer or a photo-coupler. Preferably, the power supply circuits A1-1 to A1-3 are, as shown in FIG. 4, each so configured as to have a plurality of secondary windings on a transformer so that they can generate different supply voltages for a plurality of channels as necessary.

The step-up circuits A2-1 to A2-3 are circuits that respectively step up the output voltages of the solar cells 10-1 to 10-3 (for example, 100 V to 250 V DC from the solar cell 10-1, and 250 V to 400 V DC from the solar cells 10-2 and 10-3) to an equal voltage level (for example, 250 V to 400 V DC) and output the stepped-up voltages. Usable as the step-up circuits A2-1 to A2-3 are switching regulators as shown in FIG. 4 that generate a desired output voltage by switching an inductor through the turning on and off of an output transistor (such as an insulated-gate bipolar transistor).

The control circuit A3 compares the output voltages of the solar cells 10-1 to 10-3 (that is, the array voltages) with the output voltages of the step-up circuits A2-1 to A2-3 respectively, generates control signals for individually driving, by PWM, the output transistors provided in the step-up circuits A2-1 to A2-3, and feeds the control signals to the step-up circuits A2-1 to A2-3 respectively.

The connection box 41B is a circuit that integrates together the output voltages from the step-up circuits A2-1 to A2-3 and outputs the integrated voltage, and preferably adopts, as shown in FIG. 4, an OR circuit composed of diodes.

The power conversion circuit section 41C is a circuit that converts the direct-current electric power from the connection box 41B to feed an alternating-current electric power matching the commercial electric power to the AC switchboard 42, and includes a step-up circuit C1, a DC/AC conversion circuit C2, and a switch circuit C3.

The step-up circuit C1 steps up the direct-current electric power (for example, 250 V to 400 V DC) from the connection box 41B to a higher voltage level (for example, 400 V to 600 V DC), and outputs the stepped-up voltage. Usable as the step-up circuit C1 is, like the step-up circuits A2-1 to A2-3 described above, a switching regulator as shown in FIG. 4 that generates a desired output voltage by switching an inductor through the turning on and off of an output transistor (such as an insulated-gate bipolar transistor).

The DC/AC conversion circuit C2 converts the direct-current electric power from the step-up circuit C1 to feed an alternating-current electric power (for example, 100V/200 V AC) matching the commercial electric power to the AC switchboard 42.

The switch circuit C3 switches the output end of the DC/AC conversion circuit C2 between a state connected to the AC switchboard 42 and a state connected to a self-sustaining load (not shown in FIG. 4). With the switch circuit C3 so configured, when there is a failure (for example, a blackout) in the commercial electric power distribution system, it is possible to disconnect the output end of the DC/AC conversion circuit C2 from the AC switchboard 42; it is thereby possible to prevent the electric power generated by solar electric power generation from flowing into the commercial electric power distribution system, and thus to prevent failure to recognize the failure (blackout) in the commercial electric power distribution system. In such a situation, the output end of the DC/AC conversion circuit C2 is connected to the self-sustaining load so that the electric power generated by solar electric power generation is consumed by the self-sustaining load. In this way, it is possible to prevent the load from abruptly falling to zero, and thereby to protect the solar power generation system from application of an overvoltage.

The power supply circuit section 41D is a circuit that generates, from at least one of the direct-current electric power from the connection box 41B and the alternating-current electric power from the AC switchboard 42, supply voltages (V1, V2, V3, V4, . . . ) for operating driver sections (circuit elements indicated by "Dry" in FIG. 4) provided in the power conversion circuit section 41C and for operating the control section 44. That is, the power supply circuit section 41D is so configured that it can accept not only the direct-current electric power from the connection box 41B but also the alternating-current electric power from the AC switchboard 42. Thus, even when the supply of electric power by solar power generation is insufficient, the power supply circuit section 41D can, by receiving the supply of electric power from the commercial electric power source, keep the control section 44 operating. Preferably, as shown in FIG. 4, the power supply circuit section 41D, like the power supply circuits A1-1 to A1-3 described above, is so configured as to perform feedback control with respect to the supply voltages to be generated (V1, V2, V3, V4, . . . ), with its input and output isolated from each other by use of a transformer or a photocoupler.

As shown in FIG. 4, the control section 44 includes an MPPT control circuit 441, an output control circuit 442, and a memory 443.

The MPPT control circuit 441 monitors the input current and input voltage to the step-up circuit C1 (that is, the direct-current electric power input from the connection box 41B) and the output voltage from the step-up circuit C1. Based on these, the MPPT control circuit 441 generates a control signal for driving the output transistor in the step-up circuit C1 by PWM, and feeds the control signal to the driver section of the step-up circuit C1.

The output control circuit 442 monitors the output current and output voltage of the DC/AC conversion circuit C2 (that is, the alternating-current electric power output from the power conversion circuit section 41C). Based on these, the output control circuit 442 generates control signals for individually controlling, by PWM, the output transistors in the DC/AC conversion circuit C2 so as to produce an alternating-current electric power (100V/200 V AC) matching the commercial electric power, and feeds those control signals respectively to the driver sections in the DC/AC conversion circuit C2. The output control circuit 442 also receives an output signal (temperature information) of a temperature sensor 45 provided near the solar cells 10-1 to 10-3, and reflects it in generating the control signals.

The plurality of signal lines connecting the MPPT control circuit 441 and the output control circuit 442 to the power conversion circuit section 41C are each isolated between input and output via a photocoupler section 47.

The memory 443 is a means of storage for storing, in the form of electronic data, the output power values of the solar cells 10-1 to 10-3 as monitored by the MPPT control circuit 441. The electronic data stored in the memory 443 is visually output on a display section 46, and is also fed to the LED driver 30 as illuminance information on outside light.

Next, the constituent elements of the above-described lighting system according to the invention will be described as more conceptual functional blocks from a different perspective.

Figure 5:
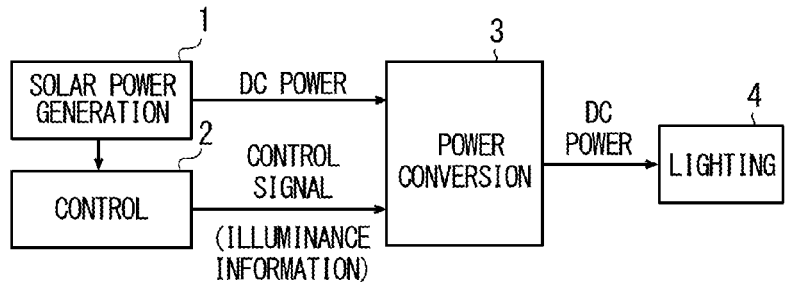
FIG. 5 is a block diagram showing a lighting system according to a first embodiment of the invention.

FIG. 5 is a block diagram of a lighting system according to a first embodiment of the invention. As shown in FIG. 5, the lighting system of this embodiment is composed of a solar power generation section 1, a control section 2 which generates a control signal (illuminance information) based on the output of the solar power generation section 1, a power conversion section 3 which converts the direct-current electric power input to it to output a direct-current electric power according to the control signal, and a lighting section 4 which is driven by the direct-current electric power output from the power conversion section 3. With this configuration, as mentioned previously, it is possible to keep the indoor illuminance constant without the use of an illuminance sensor, and thus with a very inexpensive configuration.

In a preferred configuration, as shown in FIG. 5, the direct-current electric power input to the power conversion section 3 is the direct-current electric power that the solar power generation section 1 generates from sunlight. With this configuration, it is possible to reduce the burden on the earth's environment.

It is preferable to use in the lighting section 4 light-emitting diodes, which operate with low electric power consumption and allow easy lighting control.

Figure 6:
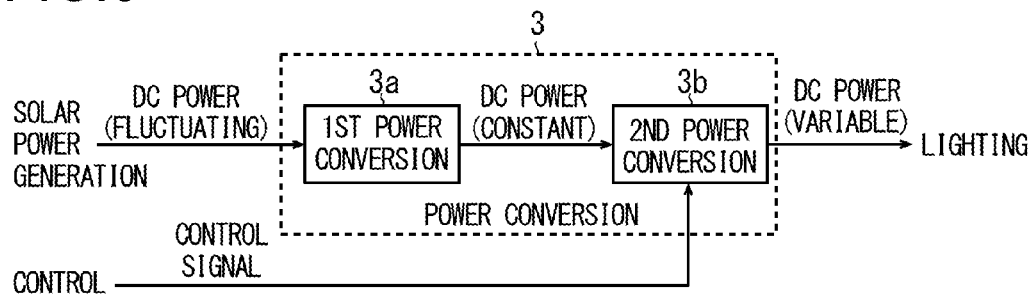
FIG. 6 is a block diagram showing an example of the configuration of a power conversion section 3.

FIG. 6 is a block diagram showing an example of the configuration of the power conversion section 3. As shown in FIG. 6, the power conversion section 3 includes, preferably, a first power conversion section 3a which converts the direct-current electric power from the solar power generation section 1 to output a predetermined direct-current electric power and a second power conversion section 3b which converts the direct-current electric power from the first power conversion section 3a to output a direct-current electric power based on the control signal. Here, the predetermined direct-current electric power produced by the first power conversion section 3a is a constant direct-current electric power. With this configuration, even when the direct-current electric power from the solar power generation section 1 varies with meteorological conditions, a constant direct-current electric power is fed from the first power conversion section 3a to the second power conversion section 3b. Thus, the second power conversion section 3b can vary the direct-current electric power to be output to the lighting section 4 properly according to the control signal (illuminance information) from the control section 2, and can thus control the lighting of the lighting section 4 reliably.

Figure 7:
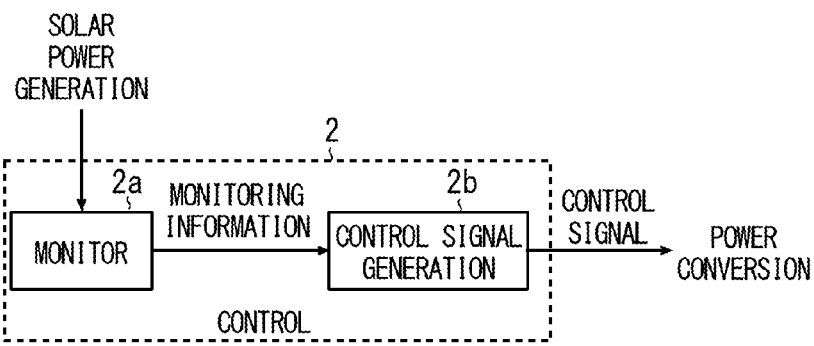
FIG. 7 is a block diagram showing an example of the configuration of a control section 2.

FIG. 7 is a block diagram showing an example of the configuration of the control section 2. As shown in FIG. 7, the control section 2 includes, preferably, a monitoring section 2a which monitors the output of the solar power generation section 1 and a control signal generation section 2b which outputs the control signal based on monitoring information from the monitoring section 2a. With this configuration, it is possible to acquire illuminance information on outside light from the output of the solar power generation section 1 based on the correlation shown in FIG. 2 previously referred to.

Figure 8:
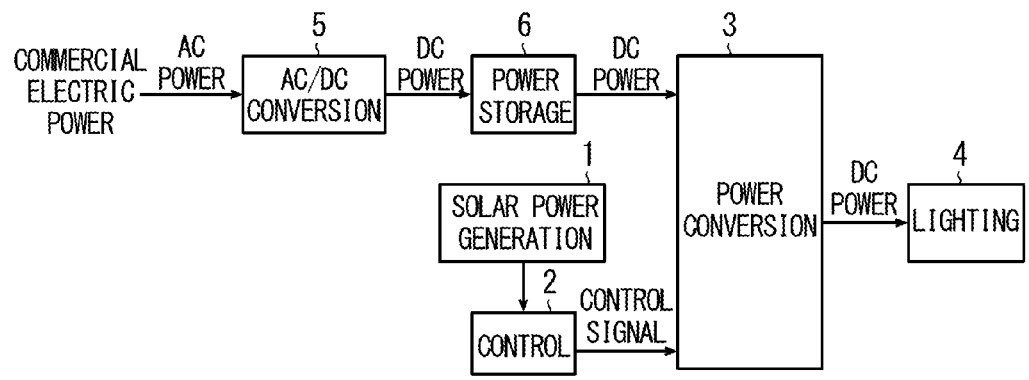
FIG. 8 is a block diagram showing a lighting system according to a second embodiment of the invention.

FIG. 8 is a block diagram of a lighting system according to a second embodiment of the invention. As shown in FIG. 8, in this embodiment, the configuration is such that the direct-current electric power input to the power conversion section 3 is based on a direct-current electric power different from the direct-current electric power generated by the solar power generation section 1. More specifically, the lighting system of this embodiment includes an AC/DC conversion section 5 which converts an alternating-current electric power from the commercial electric power source into a direct-current electric power, and a power storage section 6 which is charged with the direct-current electric power generated by the AC/DC conversion section 5 (that is, a direct-current electric power based on the commercial electric power) and which generates the direct-current electric power input to the power conversion section 3. With this configuration, even in a situation where solar power generation is impossible (for example, in the night), it is possible to drive the lighting section 4 reliably.

Figure 9:
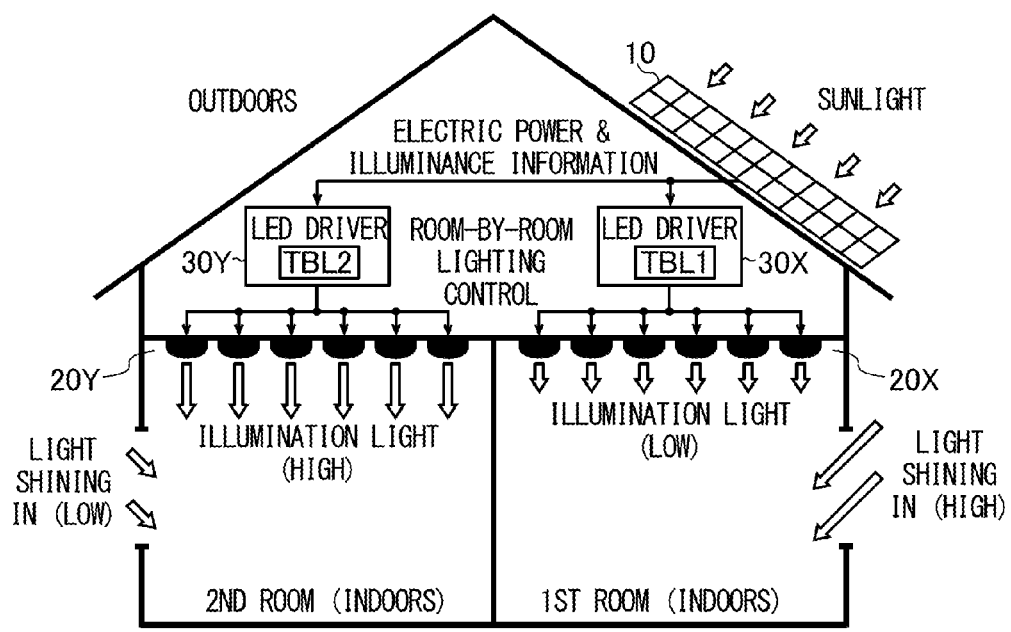
FIG. 9 is a schematic diagram showing a lighting system according to a second application example of the invention.

FIG. 9 is a schematic diagram showing a lighting system according to a second application example of the invention. As shown in FIG. 9, the lighting system according to the invention includes a solar cell 10 which is installed outdoors, an LED light 20X installed in a first room (indoors), an LED light 20Y installed in a second room (indoors), and LED drivers 30X and 30Y which control the lighting of the LED lights 20X and 20Y respectively. In FIG. 9, the LED light 20X and LED driver 30X are illustrated as separate block elements, and so are the LED light 20Y and the LED driver 30Y; instead, the LED drivers 30X and 30Y may be incorporated in the LED lights 20X and 20Y respectively.

Here, the first room, where the LED light 20X is installed, and the second room, where the LED light 20Y is installed, differ in size and in the direction in which they have windows, and accordingly the light shining into them from outside (outside light) differs in intensity. Thus, generating luminance control signals for the LED lights 20X and 20Y uniformly from a single piece of illuminance information (the outdoor illuminance) may not always result in proper lighting control.

To avoid that, in the lighting system according to the invention, the LED drivers 30X and 30Y respectively incorporate table information TBL1 and TBL2 which are referred to when luminance control signals for the LED lights 20X and 20Y are generated based on the illuminance information acquired by the solar cell 10, and the content of the table information TBL1 and TBL2 can be changed as desired. With this configuration, by optimizing the content of the table information TBL1 and TBL2 according to the size of rooms and the direction in which they have windows, it is possible, based on a single piece of illuminance information acquired by the solar cell 10, to perform proper light control for both of the LED lights 20X and 20Y installed in different rooms.

For example, in a case where it is previously known that the light shining into the first room is more intense than that shining into the second room, the content of the table information TBL1 and TBL2 provided in the LED drivers 30X and 30Y respectively is so adjusted that, for a given illuminance value detected on the basis of the output power of the solar power generation section 10, the luminance value set for the LED light 20X is greater than the luminance value set for the LED light 20Y.

The content of the table information TBL1 and TBL2 may be set by being selected from a plurality of alternatives (different sets of table information, such as one for a living room facing south, one for a bed room facing west, etc., previously set with consideration given to common room arrangements in houses), or may be adjustable finely on the basis of the correlation between the illuminance value of outside light (the output power of the solar cell 10) and the luminance value of the LED light.

The above table information can be set, for example, through operation of a switch or the like provided in the body of the LED lights or in a remote control unit. In a case where the LED lights are equipped for connection to a home network, the table information may be set by remote control from a personal computer or the like on the home network.

Next, lighting control according to the direction of the sun will be described with reference to FIGS. 10A to 10C. FIG. 10A is a schematic diagram showing an example of how solar cell panels are installed, FIG. 10B is a block diagram of the lighting system, and FIG. 10C is a lighting color table.

As shown in FIG. 10B, a lighting system 100 provided with a function of controlling lighting according to the direction of the sun includes solar cell panels 110E, 110S, and 110W, DC step-up sections 120E, 120S, and 120W, and voltage-illuminance conversion sections 130E, 130S, and 130W.

The solar cell panels 110E, 110S, and 110W are installed on parts of a roof facing east, south, and west respectively.

The DC step-up sections 120E, 120S, and 120W step up the output voltages of the solar cell panels 110E, 110S, and 110W respectively and output the stepped-up voltages. Here, the DC step-up sections 120E, 120S, and 120W are all subject to MPPT control by an unillustrated controller so that the solar cell panels 110E, 110S, and 110W all yield their maximum outputs according to the illuminance there.

The voltage-illuminance conversion sections 130E, 130S, and 130W monitor the output powers POWER1, POWER2, and POWER3 of the DC step-up sections 120E, 120S, and 120W respectively, and converts them to output illuminance information. That is, the voltage-illuminance conversion sections 130E, 130S, and 130W can calculate the illuminance in different directions (here, three directions, namely east, south, and west) respectively.

By comparing the illuminance in different directions calculated as described above, it is possible to recognize the direction of the sun, and hence to perform lighting control according to the direction of the sun.

For example, as shown in FIG. 10C, when the illuminance in the east, south, and west directions decreases in this order, the sun is supposed to be in the east, and thus it is supposed to be morning. Accordingly, the light fittings installed in the rooms can be lit with a freshening color that eases wakening up (for example, a bluish white color with a high color temperature), or their luminance can be controlled according to the directions in which the rooms face (the directions in which they have windows).

When the illuminance is higher in the south than in the east and west where it is largely equal, the sun is supposed to be in the south, and thus it is supposed to be midday. Accordingly, the light fittings installed in the rooms can be lit with a natural color close to sunlight (for example, a white color with a medium color temperature), or their luminance can be controlled according to the directions in which the rooms face (the directions in which they have windows).

When the illuminance in the west, south, and east directions decreases in this order, the sun is supposed to be in the west, and thus it is supposed to be evening. Accordingly, the light fittings installed in the rooms can be lit with a subdued color (for example, an incandescent lamp-like color with a low color temperature), or their luminance can be controlled according to the directions in which the rooms face (the directions in which they have windows).

Although the above description deals with an example in which solar cell panels are installed on parts of a roof facing in different directions respectively, it is also possible to install a plurality of solar cell panels on a part of a roof facing in one direction, in which case it is preferable that the plurality of solar cell panels be installed to face different directions.

Next, how electric power is supplied from a solar cell panel to a light fitting will be described in detail by way of three methods.

Figure 11A:
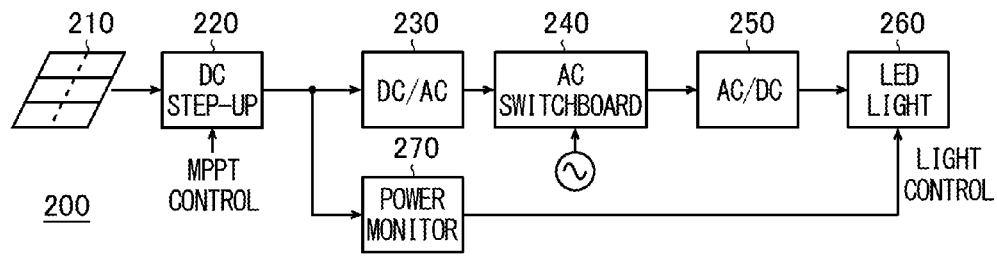
FIG. 11A is a diagram showing a first power supply method.

FIG. 11A is a block diagram showing a first power supply method. As shown in FIG. 11A, a lighting system 200 adopting the first power supply method includes a solar cell panel 210, a DC step-up section 220, a DC/AC conversion section 230, an AC switchboard 240, an AC/DC conversion section 250, an LED light 260, and a power monitor 270.

The configuration shown in FIG. 11A is basically the same as that shown in FIGS. 3 and 4 previously referred to. The direct-current electric power (for example, 100V to 250V DC) generated by the solar cell panel 210 is first converted into an alternating-current electric power (for example, 100 V/200 V AC) matching the commercial electric power, is then converted back into a direct-current electric power (for example, 40 V DC), and is then supplied to the LED light 260.

One drawback with the first power supply method described above is that the DC/AC conversion section and the AC/DC conversion section provided in the power feed path from the solar cell panel 210 to the LED light 260 cause an unnecessary power loss.

Figure 11B:
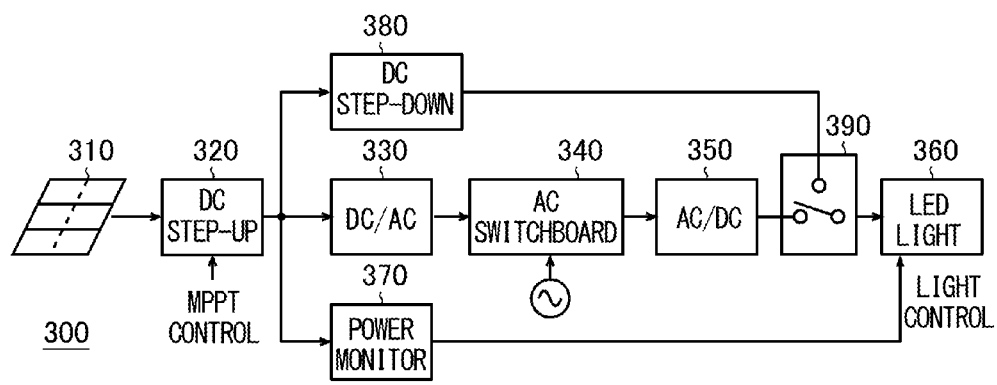
FIG. 11B is a diagram showing a second power supply method.

FIG. 11B is a block diagram showing a second power supply method. As shown in FIG. 11A, a lighting system 300 adopting the second power supply method includes a solar cell panel 310, a DC step-up section 320, a DC/AC conversion section 330, an AC switchboard 340, an AC/DC conversion section 350, an LED light 360, and a power monitor 370, and further includes a DC step-down section 380 and a selector 390.

The configuration shown in FIG. 11B is basically the same as that shown in FIG. 11A previously referred to, the difference being the additional provision of a power feed path across which the direct-current electric power generated by the solar cell panel 310 is supplied to the LED driver 30 without ever being converted into alternating-current electric power.

The first power feed path is, as in FIG. 11A previously referred to, a path leading from the solar cell panel 310 to the DC step-up section 320, to the DC/AC conversion section 330, to the AC switchboard 340, to AC/DC conversion section 350, and eventually to the LED light 360. When electric power is supplied across this first power feed path, the direct-current electric power (for example, 100V to 250V DC) generated by the solar cell panel 310 is first converted into an alternating-current electric power (for example, 100V/200V AC) matching the commercial electric power, is then converted back into direct-current electric power (for example, 40 V DC), and is then supplied to the LED light 360.

The second power feed path is a path leading from the solar cell panel 310 to the DC step-up section 320, to the DC step-down section 280, and eventually to the LED light 360. When electric power is supplied across this second power feed path, the direct-current electric power (for example, 100V to 250V DC) generated by the solar cell panel 310 is first stepped up to a higher voltage level (for example, 400 V to 600 V DC), is then stepped down to a voltage level (for example, 40 V DC) needed to drive lighting, and is then supplied to the LED light 360.

The selector 390 selects which of the first and second power feed paths to use. For example, when the solar cell panel 310 is not generating a sufficient direct-current electric power for the LED light 360, the selector 390 selects the first power feed path; when the solar cell panel 310 is generating a sufficient direct-current electric power for the LED light 360, the selector 390 selects the second power feed path.

With the second power supply method described above, no DC/AC conversion section or AC/DC conversion section is provided in the second power feed path leading from the solar cell panel 310 to the LED light 360, and this helps suppress unnecessary power loss.

A drawback with both the first and second power supply methods is that the input voltage to the DC/AC conversion section 230 or 330 needs to have been stepped-up to a high voltage level (for example 400 V to 600 V DC) and this requires that the DC step-up section 220 or 320 and the DC/AC conversion section 230 or 330 use circuit elements that withstand high voltages.

Figure 11C:
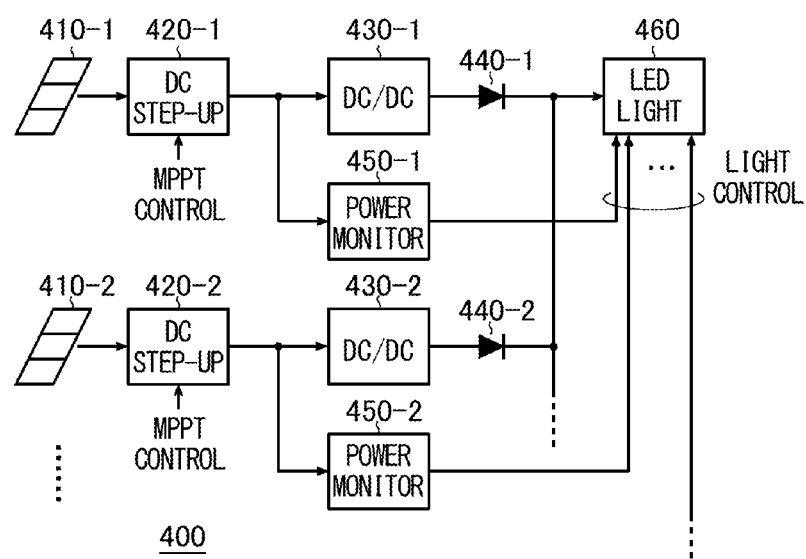
FIG. 11C is a diagram showing a third power supply method.

FIG. 11C is a block diagram showing a third power supply method. As shown in FIG. 11C, a lighting system 400 adopting the third power supply method includes solar cell panels 410-1 and 410-2, DC step-up sections 420-1 and 420-2, DC/DC conversion sections 430-1 and 430-2, diodes 440-1 and 440-2, power monitors 450-1 and 450-2, and an LED light 460. Here, any other number of solar cell panels may be installed in parallel.

The configuration shown in FIG. 11C differs from that shown in FIG. 11B previously referred to in that the first power feed path (the power feed path via the DC/AC conversion section) is removed and that a plurality of solar cell panels are installed in parallel. The direct-current electric power (for example, 5V DC) generated by the solar cell panel 410-1 is converted, by the DC step-up section 420-1 and the DC/DC conversion section 430-1, to a voltage level (for example, 40 V DC) needed to drive the lighting of the LED light 460. Likewise, the direct-current electric power generated by the solar cell panel 410-2 is converted, by the DC step-up section 420-2 and the DC/DC conversion section 430-2, to a voltage level needed to drive the lighting of the LED light 460. The thus produced direct-current electric power is supplied, via an OR circuit composed of the diodes 440-1 and 440-2, to the LED light 460.

With the third power supply method described above, there is no need to produce a high voltage (for example, 400 V to 600 V DC) needed for DC/AC conversion, and thus there is no need to use circuit elements that withstand high voltages. Moreover, it is possible to use, as the solar cell panels, small, low-output panels, and thus to install the solar cell panels on a small roof. Moreover, while with a large panel having a large number of cells connected in series, insufficient sun light only in part of the panel disables the entire panel from outputting the generated electric power, with a configuration in which a plurality of small panels each having a small number of cells connected in series are installed in parallel, even when part of the panels are unable to output the generated electric power, the rest of the panels can output the generated electric power normally. Thus, it is possible to continue the output of the generated electric power more stably than with a configuration in which a single large panel is installed.

Next, lighting control according to time of day will be described. FIG. 12 shows a table in illustration of lighting control according to time of day. For example, under low illuminance (under dim light), irrespective of whether the current time of day belongs to the daytime or the nighttime, the light fitting is automatically lit at its maximum luminance value. Under medium illuminance, whether to perform lighting control automatically or manually is determined according to whether the current time of day belongs to the daytime or the nighttime. Likewise, under high illuminance (under bright light), whether to extinguish the light fitting automatically or manually is determined according to whether the current time of day belongs to the daytime or the nighttime.

The present invention may be implemented with any configurations other than those in the embodiments presented above, and many modifications and variations are possible within the spirit of the invention. That is, it should be understood that the embodiments presented above are in every respect only illustrative and not restrictive; it should also be understood that the technical scope of the invention is defined not by the description of the embodiments presented above but by the appended claims and encompasses any modifications and variations within the sense and scope equivalent to those of the claims.

Figure 13:
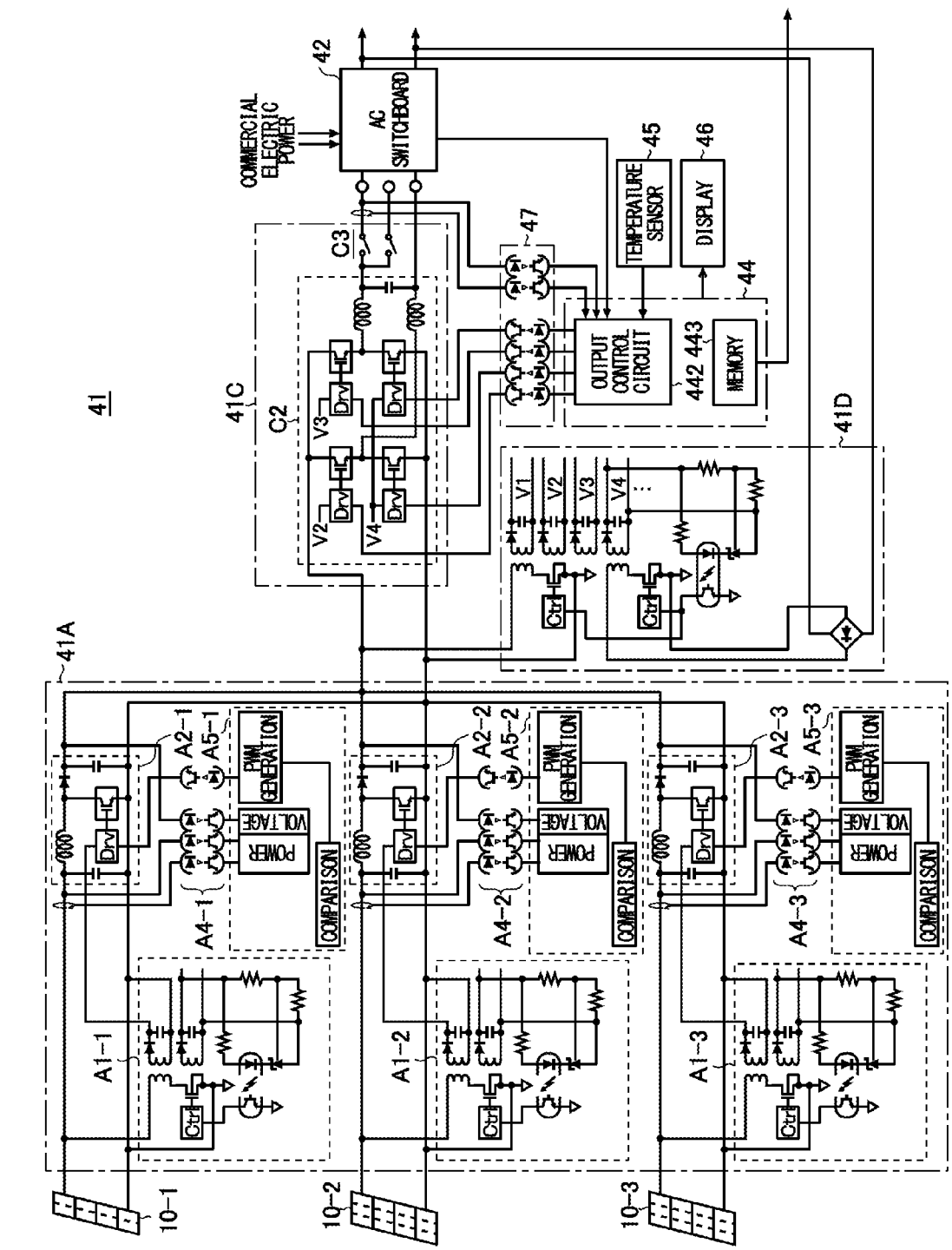
FIG. 13 is a block diagram showing a modified example of the power supply device 40.
Figure 14:
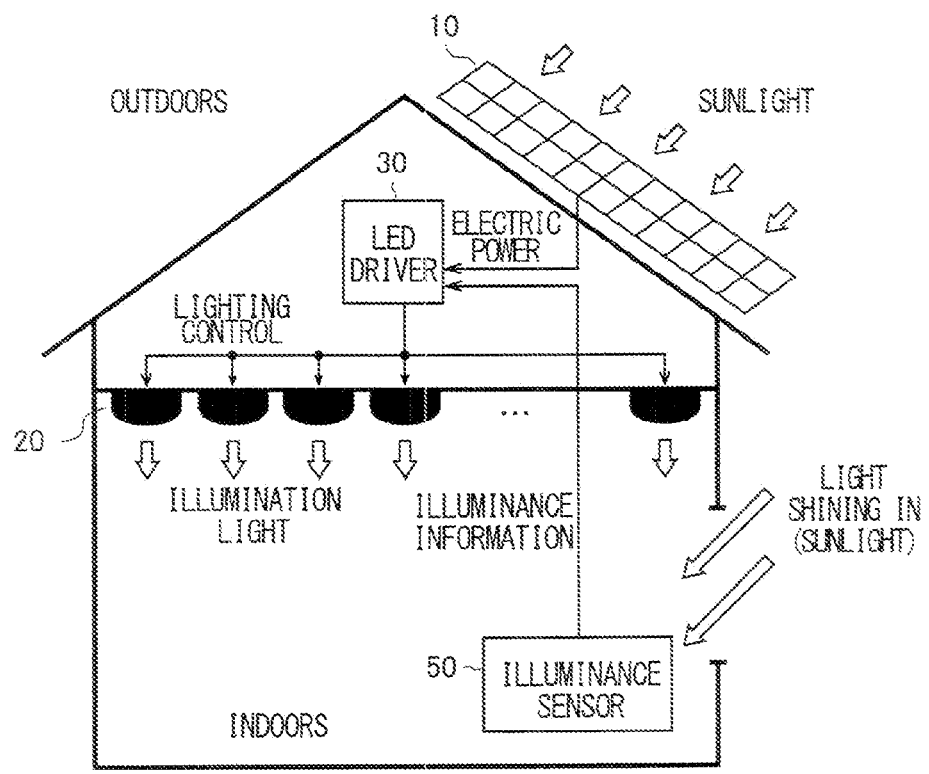
FIG. 14 is a schematic diagram showing a conventional example of a lighting system.
Figure 15:
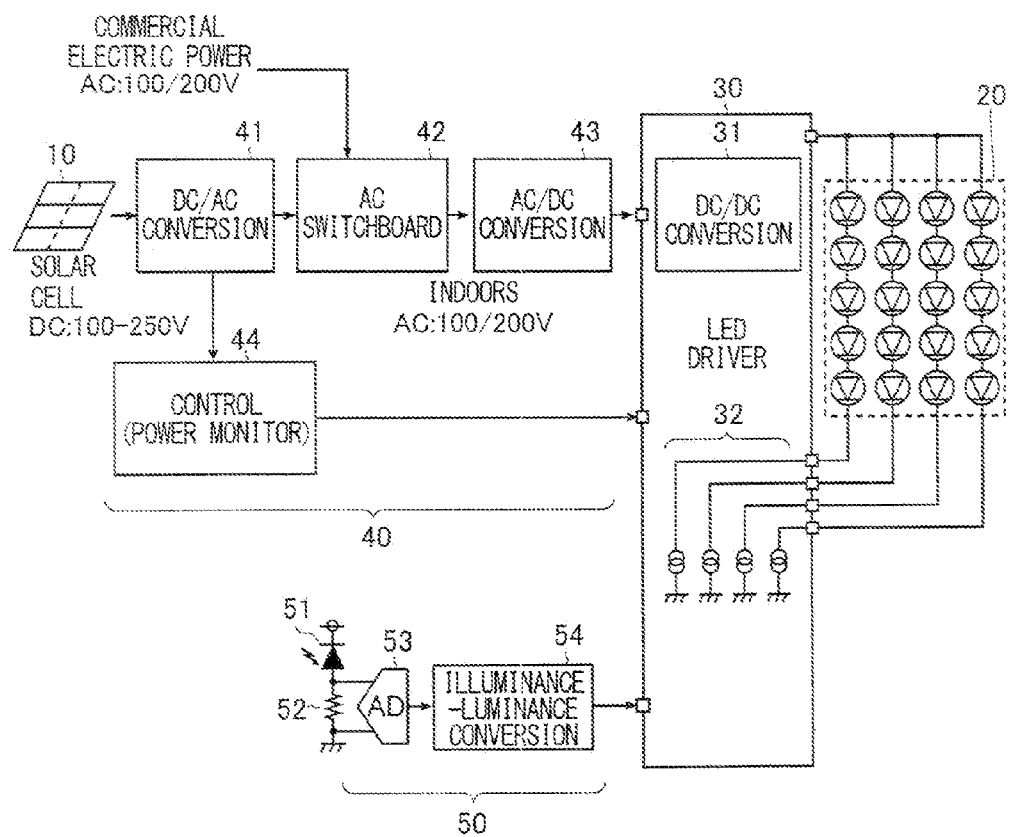
FIG. 15 is a block diagram showing a conventional example of a lighting system.

For example, although FIG. 4 shows an example of a configuration in which the output voltage from the step-up circuits A2-1 to A2-3 are integrated together in the connection box 41B and the direct-current electric power (for example, 250 V to 400 V DC) output from the connection box 41B is stepped up to a higher voltage level in the step-up circuit C1, this is not meant to limit the invention; instead, a configuration as shown in FIG. 13 may be adopted in which step-up circuits A2-1 to A2-3 are connected via photocouplers A4-1 to A4-3 to MPPT control circuits A5-1 to A5-3 respectively so that their respective output voltages also have a voltage level fit for input to the DC/AC conversion circuit C2 and the output terminals of the step-up circuits A2-1 to A2-3 are directly connected to the input terminals of the DC/AC conversion circuit C2. With this configuration, it is possible to omit the connection box 41B and step-up circuit C1 shown in FIG. 4.

LIST OF REFERENCE SIGNS 1 solar power generation section
2 control section
2a monitoring section
2b control signal generation section 3 power conversion section
3a first power conversion section
3b second power conversion section
4 lighting section
5 AC/DC conversion section
6 power storage section
10 solar cell
20 LED light (light fitting)
30 LED driver
31 DC/DC conversion section
32 current control section
40 power supply device
41 DC/AC conversion section
41A step-up box
A1-1, A1-2, A1-3 power supply circuit
A2-1, A2-2, A2-3 step-up circuit
A3 control circuit
A4-1, A4-2, A4-3 photocoupler
A5-1, A5-2, A5-3 MPPT control circuit
41B connection box
41C power conversion circuit section
C1 step-up circuit
C2 DC/AC conversion circuit
C3 switch circuit
41D power supply circuit section
42 AC switchboard
43 AC/DC conversion section
44 control section (power monitor)
441 MPPT control circuit
442 output control circuit
443 memory
45 temperature sensor
46 display section
47 photocoupler section
100 lighting system
110E, 110S, 110W solar cell
120E, 120S, 120W DC step-up sections
130E, 130S, 130W voltage-illuminance conversion section
200 lighting system
210 solar cell panel
220 DC step-up section
230 DC/AC conversion section
240 AC switchboard
250 AC/DC conversion section
260 LED light
270 power monitor
300 lighting system
310 solar cell panel
320 DC step-up section
330 DC/AC conversion section
340 AC switchboard
350 AC/DC conversion section
360 LED light
370 power monitor
380 DC step-down section
390 selector
400 lighting system
410-1, 410-2 solar cell panel
420-1, 420-2 DC step-up section
430-1, 430-2 DC/DC conversion section
440-1, 440-2 diode
450-1, 450-2 power monitors
460 LED light

The invention claimed is:
1. A lighting system comprising:
a solar power generation section;
a first step-up circuit which steps up a first output voltage generated by the solar power generation section to output a second output voltage;
a control section which detects the first output voltage, the second output voltage and an input current of the first step-up circuit to control the first step-up circuit according to the result of the detection;
a DC/AC conversion circuit which converts the second output voltage into an alternating-current voltage;
a switch board into which the alternating-current voltage is fed;
a lighting device which is driven by electric power output from the switchboard; and
a lighting control section which controls illuminance of the lighting device by using the result of the detection obtained by the control section, wherein
the solar power generation section includes:
a solar cell; and
a second step-up circuit which steps up an output voltage generated by the solar cell to output the first output voltage, and wherein
the control section performs maximum power point tracking control so as to maximize output power of the solar cell according to the result of the detection.
2. The lighting system according to claim 1, wherein the control section comprises:
a monitoring section which monitors the output of the solar power generation section; and
a control signal generation section which outputs a control signal based on monitoring information from the monitoring section.
3. The lighting system according to claim 1, wherein the lighting device comprises a light emitting diode.

* * * * *